US009329103B2

(12) United States Patent
Oblizajek et al.

(10) Patent No.: US 9,329,103 B2
(45) Date of Patent: May 3, 2016

(54) METHODS AND SYSTEMS FOR CHARACTERIZING VEHICLE TIRES

(71) Applicant: GM Global Technology Operations LLC, Detroit, MI (US)

(72) Inventors: Kenneth L. Oblizajek, Troy, MI (US); John D. Sopoci, Commerce Township, MI (US); Jinshuo Zhu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 733 days.

(21) Appl. No.: 13/678,063

(22) Filed: Nov. 15, 2012

(65) Prior Publication Data
US 2013/0073224 A1  Mar. 21, 2013

Related U.S. Application Data

(63) Continuation-in-part of application No. 13/352,915, filed on Jan. 18, 2012, now Pat. No. 9,121,790.

(60) Provisional application No. 61/437,395, filed on Jan. 28, 2011.

(51) Int. Cl.
*G01L 1/00* (2006.01)
*G01M 17/02* (2006.01)
(52) U.S. Cl.
CPC ..................... *G01M 17/02* (2013.01)
(58) Field of Classification Search
CPC .............................. G01M 17/02; G01M 17/025
See application file for complete search history.

(56) References Cited

U.S. PATENT DOCUMENTS

| 4,359,896 | A | * | 11/1982 | Brown et al. ................... 73/146 |
| 5,691,477 | A | | 11/1997 | Di Bernardo et al. |
| 5,811,672 | A | | 9/1998 | Mancosu et al. |
| 6,327,904 | B1 | | 12/2001 | Oldenettel |

(Continued)

FOREIGN PATENT DOCUMENTS

| CN | 1180163 A | 4/1998 |
| CN | 101271035 A | 9/2008 |

(Continued)

OTHER PUBLICATIONS

State Intellectual Property Office of the People's Republic of China, Office Action for Chinese Patent Application No. 201210020814.2, mailed May 16, 2014.

(Continued)

*Primary Examiner* — Elias Desta
(74) *Attorney, Agent, or Firm* — Ingrassia Fisher & Lorenz, P.C.

(57) ABSTRACT

A system for characterizing a vehicle tire is provided. The system includes a testing assembly configured to support the vehicle tire. The assembly includes a force-moment transducer configured to gather force information from the vehicle tire in response to a stimulus on the vehicle tire. The system further includes an accelerometer coupled to the vehicle tire and configured to gather vibration information from the vehicle tire in response to the stimulus on the vehicle tire. The system further includes a post-processing system configured to receive the vibration information from the accelerometer and the force information from the force-moment transducer. The post-processing system is further configured to extract resonant frequencies from the vibration information and the force information.

13 Claims, 9 Drawing Sheets

(56) References Cited

U.S. PATENT DOCUMENTS

| | | |
|---|---|---|
| 6,450,020 B1 | 9/2002 | Naito et al. |
| 7,040,154 B2 | 5/2006 | Shaw et al. |
| 7,756,620 B2 * | 7/2010 | Bedner et al. .................. 701/41 |
| 2007/0139179 A1 | 6/2007 | Yanase |
| 2012/0197549 A1 | 8/2012 | Oblizajek et al. |

FOREIGN PATENT DOCUMENTS

| | | |
|---|---|---|
| CN | 102227619 A | 10/2011 |
| DE | 3624589 A1 | 1/1988 |

OTHER PUBLICATIONS

Peng-Min, Lu et al., "Vehicle dynamic load property resulted from road random roughness," Journal of Traffic and Transportation Engineering, pp. 55-58, issue 6, vol. 7, 2007. (Abstract only).

Pan-Deng, Zhang, "Test Analysis and Improvement of Big Displacement Vibration for XMQ6116 Coach under Certain Speed," Bus Technology and Research, pp. 50-52, issue 5, 2010. (Abstract only).

Cannon, R.H., "Dynamics of Physical Systems," McGraw-Hill Publishing, ISBN 07-009754-2, Part C: Natural Behavior of Compound Systems, Chapter 13—Coupled Modes of Natural Motion: Many Degrees of Freedom, 13.7: Rayleigh's Method, 1967.

Anderson, R.A., "Fundamentals of Vibrations," Macmillan Company, Lib Congress Cat No. 67-13599, Rayleigh's Method, pp. 222-238.

Harris, Cyril M., "Shock & Vibration Handbook," 3rd Ed, ISBN 0-07-026801-0, 1988, Rayleigh's and Ritz's Methods, pp. 7-2 to 7-16.

Timoshenko, S., et al., "Vibration Problems in Engineering," 4th Ed, ISBN 0-471-87315-2, Circular Membranes, pp. 489-506, 1974.

Clark, Samuel K., "Mechanics of Pneumatic Tires," 2nd Ed, USDOT, NHTSA, Chapter 9, Analysis of Tire Properties, Tread-Ban Free Vibrations, pp. 764-773.

Hartog, J.P. Den, "Mechanical Vibrations," 4th Ed, McGraw-Hill, ISBN 07-016389-8, Chapter 4, Many Degrees of Freedom, Sec 4.5, Rayleigh's Method, 1956.

Tse, F.S., et al., "Mechanical Vibrations," 3rd Printing, Lib Congress Cat No. 63-9257, Chapter 6, Methods of Determining Natural Frequencies, Sec 6-2 Rayleigh Method, Sec 6-3 Rayleigh Method: Graphical Technique, pp. 208-213, 1963.

USPTO, Office Action for U.S. Appl. No. 13/352,915 mailed Oct. 1, 2014.

USPTO, Amendment and Response for U.S. Appl. No. 13/352,915 mailed Dec. 29, 2014.

State Intellectual Property Office of the People's Republic of China, Office Action in Chinese Patent Application No. 201210020814.2, mailed Dec. 16, 2014.

Oblizajek, Kenneth L., et al. Methods and Systems for Evaluating Tire Properties, U.S. Appl. No. 13/352,915, filed Jan. 18, 2012.

State Intellectual Property Office of the People's Republic of China, Office Action in Chinese Patent Application No. 201310757215.3 mailed Nov. 3, 2015.

* cited by examiner

METHODS AND SYSTEMS FOR CHARACTERIZING VEHICLE TIRES

CROSS REFERENCE TO RELATED APPLICATIONS

This application is a continuation in part of U.S. application Ser. No. 13/352,915, filed Jan. 18, 2012, which claims the benefit of U.S. Provisional Application No. 61/437,395, filed Jan. 28, 2011, the entirety of each being hereby incorporated by reference.

TECHNICAL FIELD

The present invention generally relates to the field of vehicles and, more specifically, to methods and systems for characterizing vehicle tires.

BACKGROUND

Vehicle tires are generally tested when designed and manufactured, and at various other points during the lifespan of the tire. For example, physical testing and finite element analysis (FEA) techniques may be performed during the development of the tires or the intended associated vehicles, for example, to evaluate vehicular performance of the tires and to further improve tire composition. However, the evaluation and/or characterization of tire properties may be improved, particularly with respect to the collection and use of tire responses data.

Accordingly, it is desirable to provide improved systems and methods for characterizing tires for a vehicle. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a system for characterizing a vehicle tire is provided. The system includes a testing assembly configured to support the vehicle tire. The assembly includes a force-moment transducer configured to gather force information from the vehicle tire in response to a stimulus on the vehicle tire. The system further includes an accelerometer coupled to the vehicle tire and configured to gather vibration information from the vehicle tire in response to the stimulus on the vehicle tire. The system further includes a post-processing system configured to receive the vibration information from the accelerometer and the force information from the force-moment transducer. The post-processing system is further configured to extract resonant frequencies from the vibration information and the force information.

In accordance with another exemplary embodiment, a testing assembly for a vehicle tire. The assembly includes a mount apparatus configured to receive the vehicle tire; a force-moment transducer coupled to the mount apparatus and configured to detect a force response associated with striking the vehicle tire; a plate assembly coupled to the force-moment transducer; and an air spring apparatus coupled to the plate assembly.

In accordance with another exemplary embodiment, a method is provided for characterizing a vehicle tire. The method includes impacting the vehicle tire with a force; measuring vibration information with an accelerometer from the vehicle tire; measuring force information with a force-moment transducer from the vehicle tire; extracting the resonant frequencies from the measured vibration information and the measured force information and characterizing the vehicle tire based on the resonant frequencies.

DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In broad terms, the exemplary embodiments discussed herein provide systems and methods for characterizing vehicle tires. In particular, a tire mounted on a testing assembly is impacted by a force device. The resulting motion and mechanical action data are measured by accelerometers and force-moment transducers. From this data, the resonant frequencies are determined, the undamped resonant frequencies and damping parameters are extracted, and the stiffness and damping coefficients are calculated. The force data measured by the force-moment transducers may be used to more accurately identify the resonant frequencies of the first few modes. The term "force data," as used herein, refers to force and moment data in radial, lateral, and tangential directions, as described below. For the case of radial modes, the radial force axis is used in conjunction with the radial first mode. For the case of lateral modes, the lateral force axis is used in conjunction with the lateral first mode and the lateral moment axis is used in conjunction with the second lateral mode. For the case of the tangential modes, the tangential moment axis is used in conjunction with the first tangential mode. The responsive force or moment axes and their association with the respective tire modes are deduced from the modal shapes and orientation of the force-moment transducer, readily interpreted by those skilled in the art. Furthermore, the stiffness and damping coefficients may be ultimately correlated to laboratory and driving response metrics to characterize the influences of the tire on the responses.

Figure 1:
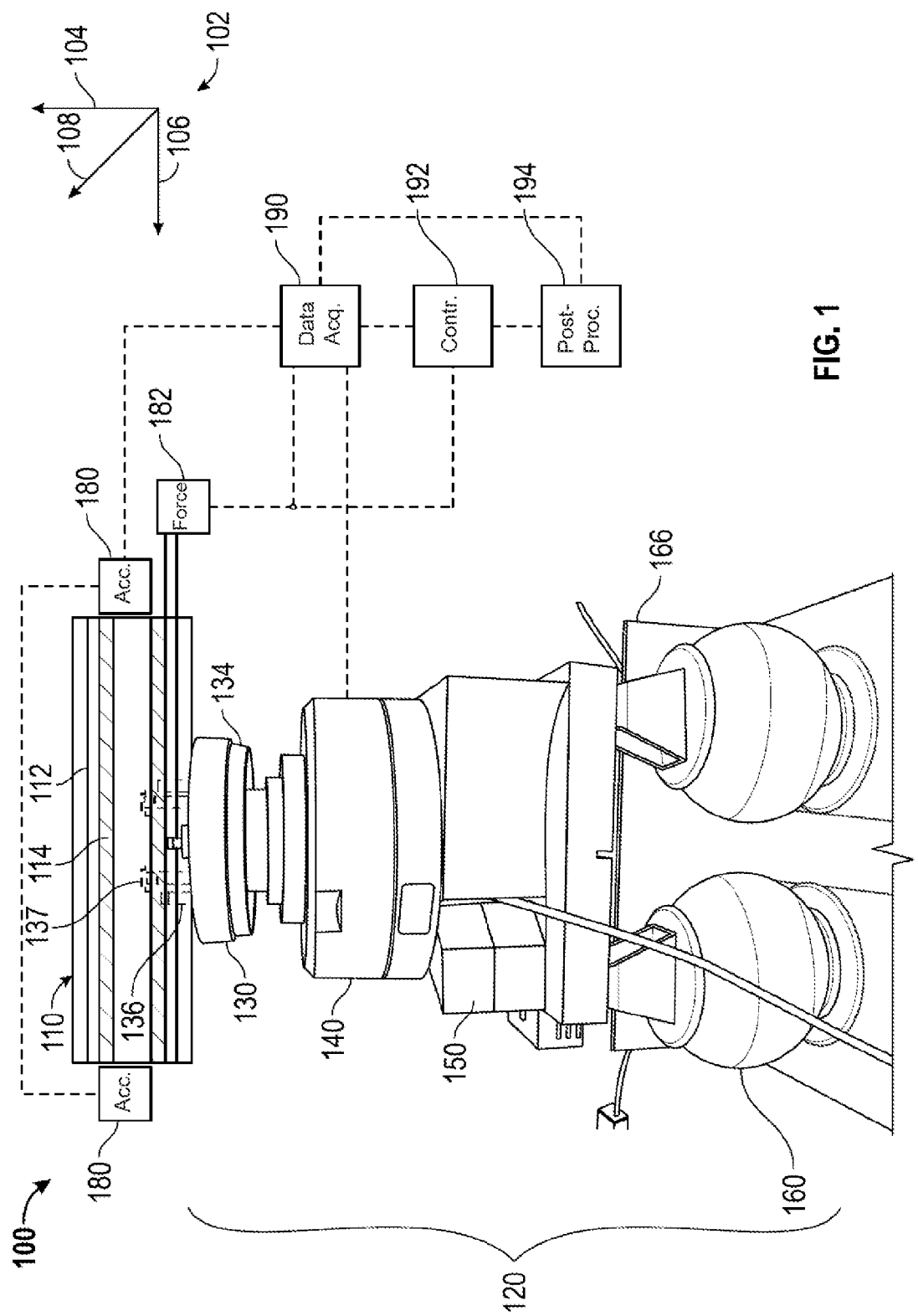
FIG. 1 is a schematic diagram of a tire characterization system in accordance with an exemplary embodiment.

FIG. 1 is a block diagram of a tire characterization system 100 in accordance with an exemplary embodiment. The system 100 generally evaluates a tire 110 on a wheel (not shown in FIG. 1) mounted on a testing assembly 120. The system 100 may further include accelerometers 180, a force device 182, data acquisition system 190, an optional controller 192, and post-processing system 194. As described in greater detail below, the testing assembly 120 includes a mount apparatus 130, a force-moment transducer 140, a plate apparatus 150, and an air spring apparatus 160.

In the view of FIG. 1, the tire 110 has a vertically oriented rotational axis. As is generally known, the tire 110 includes beads (not shown) configured to contact the wheel, sidewalls (not shown) extending from the bead, and tread 112 that extends from the sidewalls and is configured to contact the road during use.

FIG. 1 additionally illustrates a legend 102 depicting a cylindrical coordinate system relative to the tread 112 the tire 110 with a radial direction 106, a tangential direction 108, and lateral direction 104. This coordinate system is used in the description below. Generally, the lateral direction 104 refers to a direction parallel to the usage axis of rotation of the tire 110 and extending from sidewall to sidewall. The radial direction 106 refers to a direction perpendicular to the axis of rotation of the tire 110 and perpendicular to the tread 112 of the tire. The tangential direction 108 refers to a direction extending along the perimeter of the annular tread 112 perpendicular to the lateral direction 104 and radial direction 106.

In one exemplary embodiment, the tire 110 is rigidly affixed to the testing assembly 120 in a configuration that is commonly referred to as a virtual "fixed-free boundary condition." This approximation may depend on the relative mass of the support structure using accepted assessment methods for these approximations. Alternative considerations employing mathematical treatment for the presence of the actual inertial contributions of the support structure are also possible. An impact or stimulus is produced by either manual action of the force device 182 or, optionally, the controller 192 actuates the force device 182 to tap or otherwise strike the tire 110 with a predetermined force such that resonant frequencies of the tire 110 are excited. The force device 182 may be, for example, an instrumented hammer or other object. The force device 182 is shown with a moving element oriented radially to excite the radial modes of the tire, but other orientations are likewise possible and desirable for detection, for example, of the lateral tire modes (e.g., force device 182 oriented laterally) and tangential tire modes (e.g., force device 182 oriented tangentially resulting in a glancing blow to the tread of the tire 110).

As described in greater detail below, the testing assembly 120 enables the force-moment transducer 140 to measure at least one of the dynamic forces and moments exerted by the tire 110 on the testing assembly 120 responsive to the impact of the force device 182 and enables the accelerometers 180 to measure the motion of the tire 110 resulting from the impact of the force device 182. Particularly, such measurements are obtained without contamination and with clear delineation between proximate modes, as also discussed below. As such, the data acquisition system 190 records the resulting vibrations received from the accelerometers 180 and force from the force device 182 and provides the data to the post-processing system 194.

As described in greater detail below, the post-processing system 194 quantifies the resonant frequencies based on the predetermined force of the force device 182 and the vibration data collected by the data acquisition system 190; extracts undamped resonant frequencies; determines various stiffness characteristics of the tire 110; and determines modal damping parameters. For selected subsets of tires, these parameters may be correlated with one or more tire responses. Subsequent measurements of tires for similar parametric characterization may then lead to projections of performance based on the quantified parameters. As also described below, examples of responses that may be projected with the stiffness and damping characteristics may include noise, ride, harshness, steering, on-center, lash, valley feel, handling, measured time responses, and the like. In this manner, the tire structure and materials may be optimized either iteratively or prospectively with adequate empirical and theoretical knowledge to provide the desired combination of responses. In addition to the techniques described herein, knowledge from other types of techniques may be used, including conceptual tire abstractions and discretized finite element representations, to guide the development of tire features, including tire construction and materials, in order to achieve desired combinations of the measured parameters. These aspects are described in greater detail below.

Generally, the controller 192 and post-processing system 194 may include any type of processor or multiple processors, single integrated circuits such as a microprocessor, or any suitable number of integrated circuit devices and/or circuit boards working in cooperation to accomplish the functions of a processing unit. During operation, the controller 170 and post-processing system 194 selectively execute one or more programs that may be stored within memory and, as such, controls the general operation of the system 100. As such, the controller 170 and post-processing system 194 may include, or have access to, any type of memory, including RAM memory, ROM memory, EPROM memory, EEPROM memory, and non-volatile RAM (NVRAM) memory. In general, such memory may store any information needed for the exemplary embodiments discussed herein, including data for the calculation of the stiffness and influence coefficients, damping, and participating mass. Although not shown, the system 100 may include a user interface with a display for providing a graphical representation of the data and results discussed below.

The testing assembly 120 will now be described in greater detail. As noted above, the testing assembly 120 includes a mount apparatus 130, a force-moment transducer 140, a plate apparatus 150, and an air spring apparatus 160. In general, the mount apparatus 130 couples the tire 110 to the testing assembly 120. As shown, the mount apparatus 130 may include a collet (not shown in FIG. 1) coupled to an adapter 134. The adapter 134 may have studs 136 that extend through holes in the wheel 111. The wheel 111 is securely affixed to the adapter 134 via the studs 136 and lug nuts 137 or other fastening means.

The force-moment transducer 140 is coupled to the mount apparatus 130 to measure the forces and moments exerted on the mount apparatus 130 by the tire 110 from the impact of the force device 182. The force-moment transducer 140 converts the measured forces and moments into signals provided to the data acquisition system 190. The transducer 140 may be firmly attached to the base of the mount apparatus 130 and the plate apparatus 150 with threaded attachment bolts (not shown). The internal structure of the transducer 140 may be machined to produce internal members promoting unique combinations of strains responsive to the individual external forces and moments at the transducer attachments. The critical strain sites may be equipped with strain gages, either metal, piezo-resistive (e.g., semiconductor materials) or piezo-responsive, in the case of electric charge generating configurations. The transducer 140 may be designed to produce a targeted level of strain for the applied forces and moments, adequate in size to create electronic signals of desired amplitude using reasonable signal conditioning and electronic gains. Furthermore, the distributed, multiple strain-responsive characteristics, e.g., change in resistance or voltage induced through capacitive effects of charge creation, are summed or differenced to form the electronic responses proportional to the external forces and moments. Any suitable or accepted technique may be provided to achieve adequate electronic signals responsive to the applied forces and moments.

As noted above, the force-moment transducer 140 is mounted on the plate apparatus 150. The plate apparatus 150 is generally one or more plates, such as steel plates, that function to stabilize the testing assembly 120. Any suitable stabilizing apparatus or arrangement may be provided.

The plate apparatus 150 is mounted to an isolation apparatus, such as the air spring apparatus 160. The air spring apparatus 160 functions to isolate the other elements of the testing assembly 120 (e.g., the plate apparatus 150, the force-moment transducer 140, and the mount apparatus 130) from the underlying surface or platform. Additionally, the air spring apparatus 160 functions to isolate the force-moment transducer 140 and the accelerometers 180 of the testing assembly 120 from any fixture modes that may otherwise be excited by the force device 182 via the tire 110. These fixture modes would otherwise distort the measurement information generated from the accelerometers 180 and force-moment transducer 140. As such, the air spring apparatus 160 provides advantageous isolation such that higher order modes may be accurately extracted with impact tests from the force device 182. In some embodiments, one or more safety devices 166 may be arranged within the air spring apparatus 160 to support the plate apparatus 150 in the event that portions of the air spring apparatus 160 are compromised and fail to support the testing assembly 120.

Figure 2:
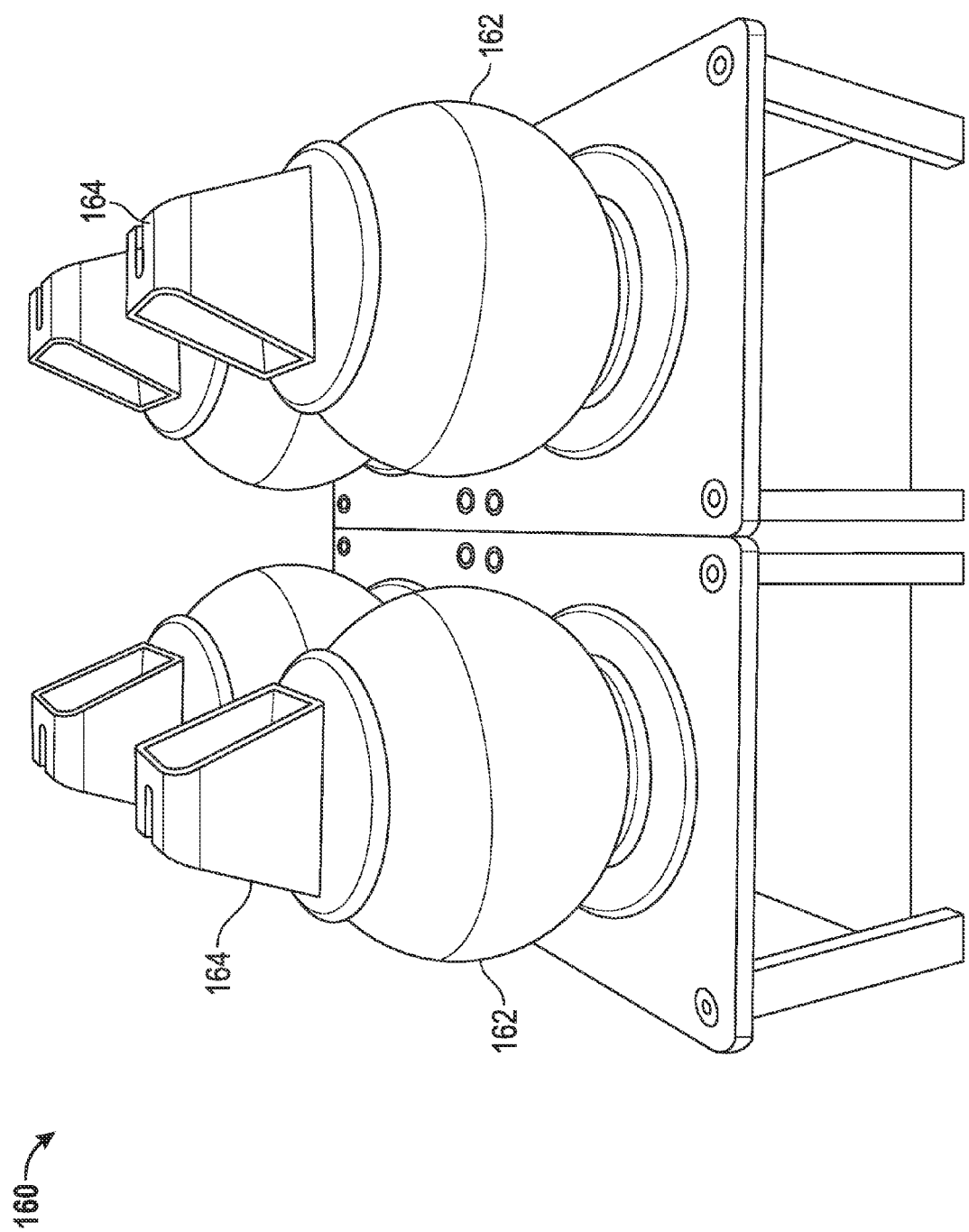
FIG. 2 is a side view of an air spring assembly of the tire characterization system of FIG. 1 in accordance with an exemplary embodiment.

FIG. 2 illustrates the air spring apparatus 160 in greater detail removed from the testing assembly 120. As shown, in one exemplary embodiment, the air spring apparatus 160 may be one or more air bladders 162, each with brackets 164 for attachment to the plate apparatus 150. The air bladders 162 may be rubber or fabric and filled with air. As shown, the air bladders 162 are spherical, although other shapes or arrangements may be provided. In the depicted embodiment, four air bladders 162 are provided, although in other embodiments, additional or fewer air bladders may be provided. In other embodiments, other types of isolators may be provided, including those made of metal or foam.

Returning to FIG. 1, as noted above, the accelerometers 180 are mounted on the tire 110 to measure motion and subsequently enable quantification of frequency information. In one exemplary embodiment, two accelerometers 180 are provided with each accelerometer 180 mounted 180° apart from one another. This configuration may enhance the signal to noise ratio for subsequent processing as described in the following.

Any number of accelerometers 180 and placement positions on the tire 110 are possible, depending on the modes of interest. For example, spatial configurations at expected active anti-nodes of selected modes amplify the summed or differenced accelerations of the selected modes (e.g., as opposed to modes that are not of interest). Weighted addition of the accelerometers by the expectation of the modal shape vectors likewise may improve the signal-to-noise ratio for detection of the various modal parameters. In one exemplary embodiment, as a compromise favoring rapid measurement and facilitating standard and efficient throughput for multiple tire characterizations, double (e.g., at 0° and 180°) or triple (e.g., at 0°, 90° and (180°) configurations of accelerometers 180 are used with appropriate post-processing of summed and differenced accelerations. In one exemplary embodiment, the accelerometers 180 are mounted on the outer periphery of the tread 112, although the accelerometers 180 may be mounted in other positions, such as on the sidewalls.

In some embodiments, various amounts of additional mass 114 may be affixed to the tire 110 to enable enhanced quantification of the participating dynamic masses in the subsequent quantifications of localized stiffness and damping. In one exemplary embodiment, the additional mass 114 may be chains. Additional details about the use of additional mass 114 to quantify the particularly dynamic masses are described below. Additionally, data may be collected for a number of 1) pneumatic pressures, e.g., for subsequent generation of the pneumatic and non-pneumatic contributions to tire characteristics, and 2) orientations, e.g., in the lateral direction 104, the radial direction 106, or the tangential direction 108.

In general, the frequency information collected from the tire 110 may be used in a number of situations. As an example, the frequency information may be used to catalogue or otherwise characterize a tire relative to other tires. In other words, the frequency information may be used as a "fingerprint" to group or separate tires with respect to one another. Moreover, the frequency information may be used to calculate other attributes of the tire 110. As one example discussed below, the frequency information may be used to quantify stiffness attributes associated with the tire 110. In turn, these stiffness attributes may be associated with driving responses, as also discussed below. The frequency information collected by system 100 may be used for any suitable purpose.

As noted above, the frequency information collected by the system may be processed to determine stiffness characteristics. To determine the relative stiffness quantities in engineering units, as described in greater detail below, the tire participating mass may be determined, as will now be described. The tire participating mass may be determined experimentally by measuring the frequencies of at least one of the responding modes under two conditions, typically with and without the addition of an incremental mass 114 at the crown of the tire. The frequency-extraction test may be run in two cases: with and without the extra mass 114 added at the tire crown. Using the undamped frequencies derived from these two cases various characteristics associated with the stiffness of the tire may be ultimately identified by initially applying the following equation for the quantification of the participating mass.

$$M = \frac{\Delta M}{\frac{f^2}{f_{\Delta M}^2} - 1} \qquad \text{Eq(1)}$$

where $f$ and $f_{\Delta M}$ are the measured frequencies without and with the added incremental modal mass, $\Delta M$, respectively; and M is the participating tire mass.

Subsequent equations may use this quantity (participating tire mass) for quantifying various stiffness properties. Sufficient incremental modal mass 114 may be added, in some cases, to overcome any uncertainty in the extraction of the resulting frequency. For example, the size of the added incremental modal mass 114 may be large enough to produce a measurable reduction in the frequency or frequencies of interest (e.g., from that of the condition(s) without the added incremental modal mass 114). An exemplary amount of added incremental modal mass 114 is 4.5 kg for current passenger-sized tires, evenly distributed around the circumference, and exemplary quantification of the participating tire mass may use the first modes of the tire in the radial, lateral and tangential directions. For these modes, the incremental modal mass is the total applied mass.

In some embodiments, modes for quantification of the tire mass with little or no crown deformation in the mode shapes may be selected to prevent or mitigate the securing mechanisms of the incremental mass 114 from producing increases in the elastic energies of the modes of interest when quantifying the participating mass. This may occur for the first modes of the various directions, e.g., radial, lateral and tangential as described in greater detail below.

The amount of added incremental modal mass 114 may be dependent on an expectation for the amount of participating tire mass and may be increased for larger mass tires (e.g., light and heavy duty tires). As stated above, the selection of the amount of added incremental mass 114 follows from a consideration of the reduction in frequency responsive to the added incremental modal mass. One technique for estimating the incremental mass for non-passenger-sized tires includes proportionally scaling the selected added incremental mass for current passenger-sized tires by the ratio of total tire mass of the subject non-passenger sized tire to that of nominal current passenger-sized tires.

Upon gathering the frequency data and extracting the undamped frequencies of a tire, discussed below, the radial stiffness characteristics may be modeled as follows in Equation (2):

$$\rho \cdot [2\pi]^2 \cdot f_{0n}^2 \cdot \left[1 + \frac{1}{n^2}\right] = \frac{\text{Coef}_1}{R^4} \cdot [n^2 - 1]^2 + \frac{\text{Coef}_2}{R^2} \cdot \left[n - \frac{1}{n}\right]^2 + \text{Coef}_3 \cdot \frac{1}{n^2} + \text{Coef}_4 \qquad \text{Eq. (2)}$$

where
$f_{0n}$=temporal frequencies, $f_0$, of the undamped modes, n, where n=1, 2, 3, ... N
n=mode number
N=largest mode number
$\rho$=density per unit circumference, $M/(2\pi R)$, (kg/m) (see Eq (1) for determination of participating mass)
R=radius of tire, (m)
$\text{Coef}_1$=the stiffness coefficient associated with bending
$\text{Coef}_2$=the stiffness coefficient associated with first shear
$\text{Coef}_3$=the stiffness coefficient associated with second shear
$\text{Coef}_4$=the stiffness coefficient associated with radial displacement Additional details and uses of Equation (2) will be discussed in greater detail below. In general, however, as the frequency data is collected, Equation (2) may be used in a regression fit to quantify the stiffness coefficients. Qualitatively, Equation (2) describes the components of the elastic energy mechanisms during the free vibrations that result from the strike.

Figure 3:
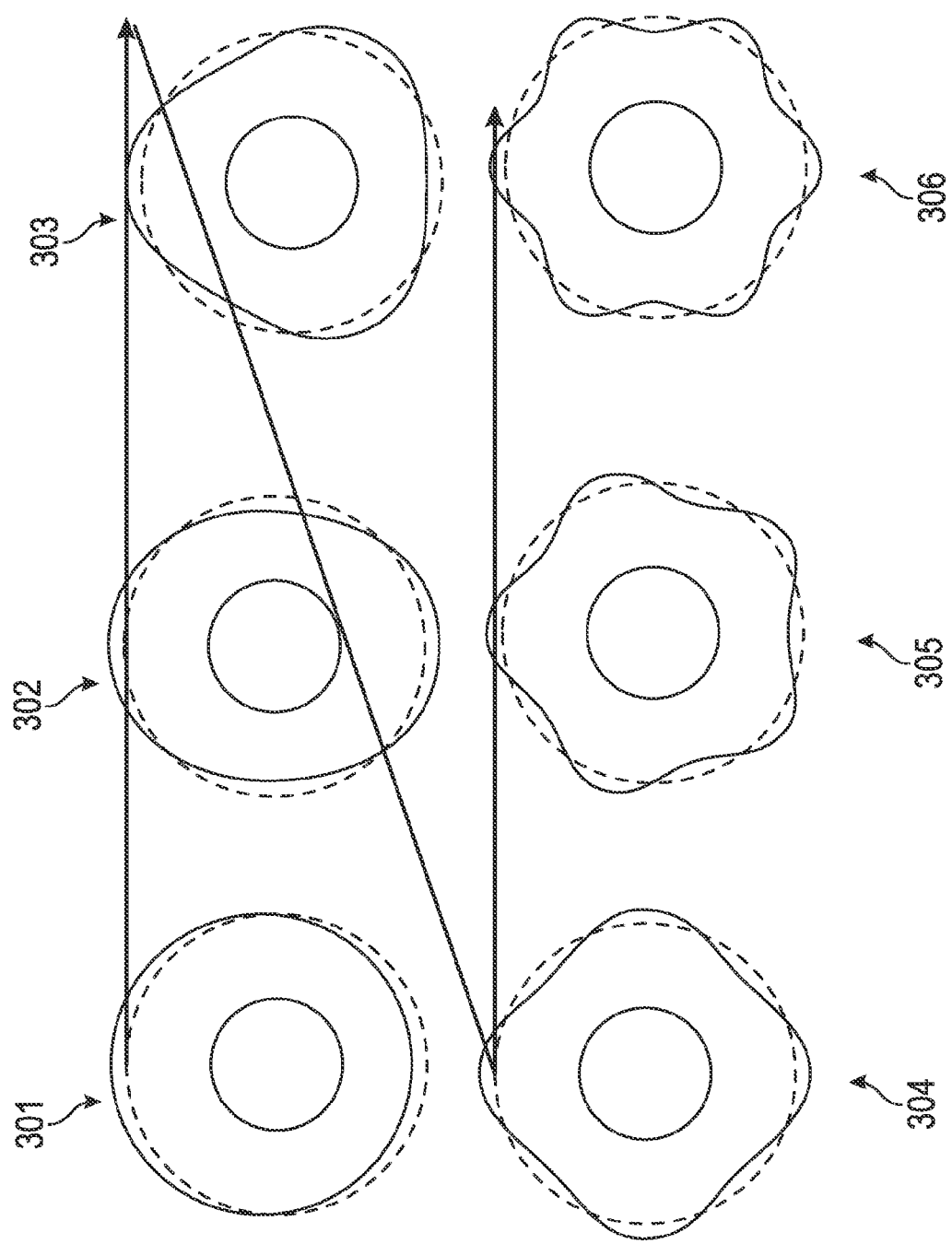
FIG. 3 is a schematic representation of vehicle tire modes that may be measured by the tire characterization system of FIG. 1 in accordance with an exemplary embodiment.

As noted above, Equation (2) uses frequency information for a number of modes in the radial direction 106. FIG. 3 illustrates the first six modes 301, 302, 303, 304, 305, 306 in the radial direction 106. The modes 301-306 may be referred to as n=1 ... 6. The first mode 301 (n=1) may be considered an asymmetric mode in a particular direction, e.g., (up or down in the view of FIG. 3). Asymmetric modes are those modes yielding large net forces and moments exerted by the tire on the mount. Symmetric modes, however, yield no or small forces and moments. The modes 302-306 may be considered symmetrical about the radial axis. As in the radial direction, the first mode of the tangential direction and the first and second modes of the lateral direction may also be considered asymmetrical with the remaining modes symmetrical. The modes, including modes 301-306, will be discussed in greater detail below. As an introduction, the force-moment transducer 140 and the accelerometers 180 may cooperate to provide more accurate identification of the frequencies corresponding to the modes 301-306.

Figure 4:
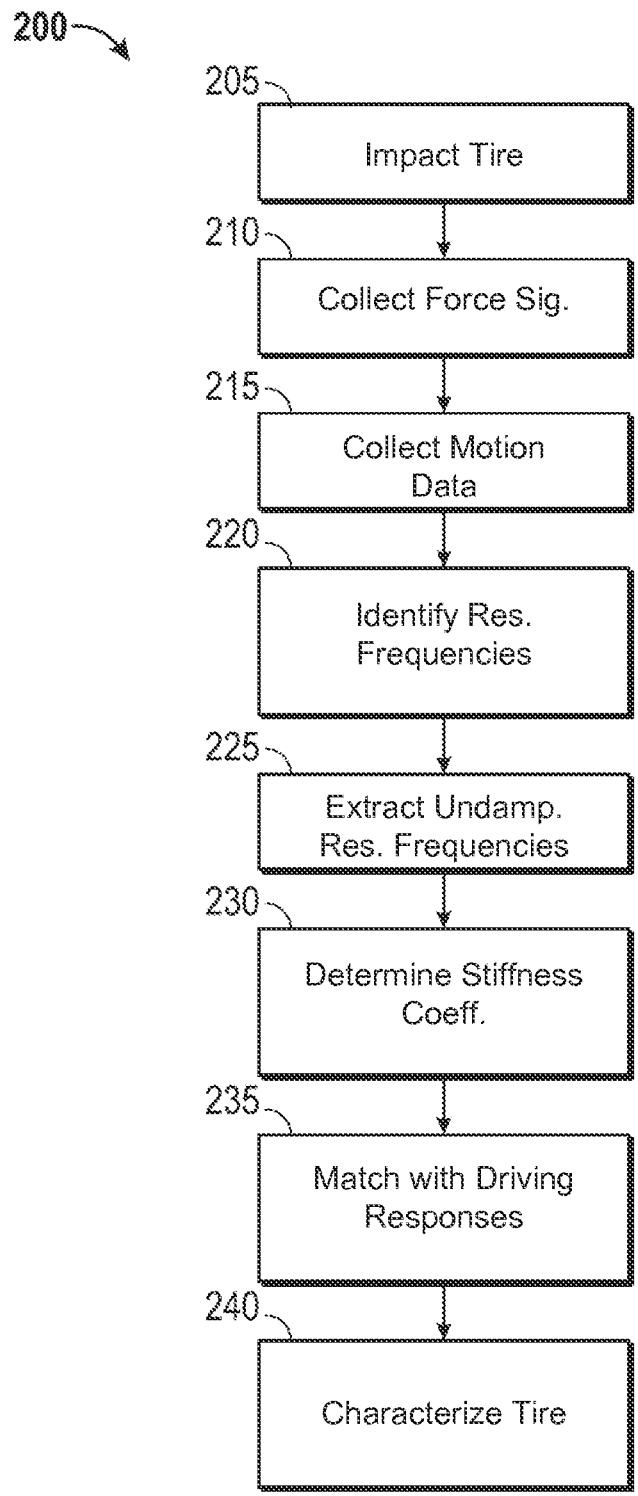
FIG. 4 is a flowchart of a method for characterizing a tire of a vehicle in accordance with an exemplary embodiment.

FIG. 4 is a flowchart of a method 200 for testing a vehicle tire. In one exemplary embodiment, the method 200 is implemented with system 100 on tire 110. As such, FIG. 1 is referenced in the discussion below. It will be appreciated that certain steps of the method 200 of FIG. 4 may vary from those depicted in FIG. 4 and/or described herein in connection therewith.

In a first step 205, the wheel of the tire 110 is rigidly affixed to the mount apparatus 130 of the testing assembly 120, and the tire tread is tapped with a predetermined force from the force device 182, e.g., as described in the testing assembly 120 above.

In a second step 210, the data acquisition system 190 collects the force signal from the force device 182 and resulting motion data from the force-moment transducer 140, including data relating to the resonant frequencies excited by the force device 182, and provides the data to the post-processing system 194. As described below, the resulting motion data detected by the force-moment transducer 140 generally corresponds to the disproportionately contributing asymmetrical modes.

In a third step 215, the data acquisition system 190 collects the resulting motion data from the accelerometers 180, including data relating to the resonant frequencies excited by the force device 182, and provides the data to the post-processing system 194.

Figure 5:
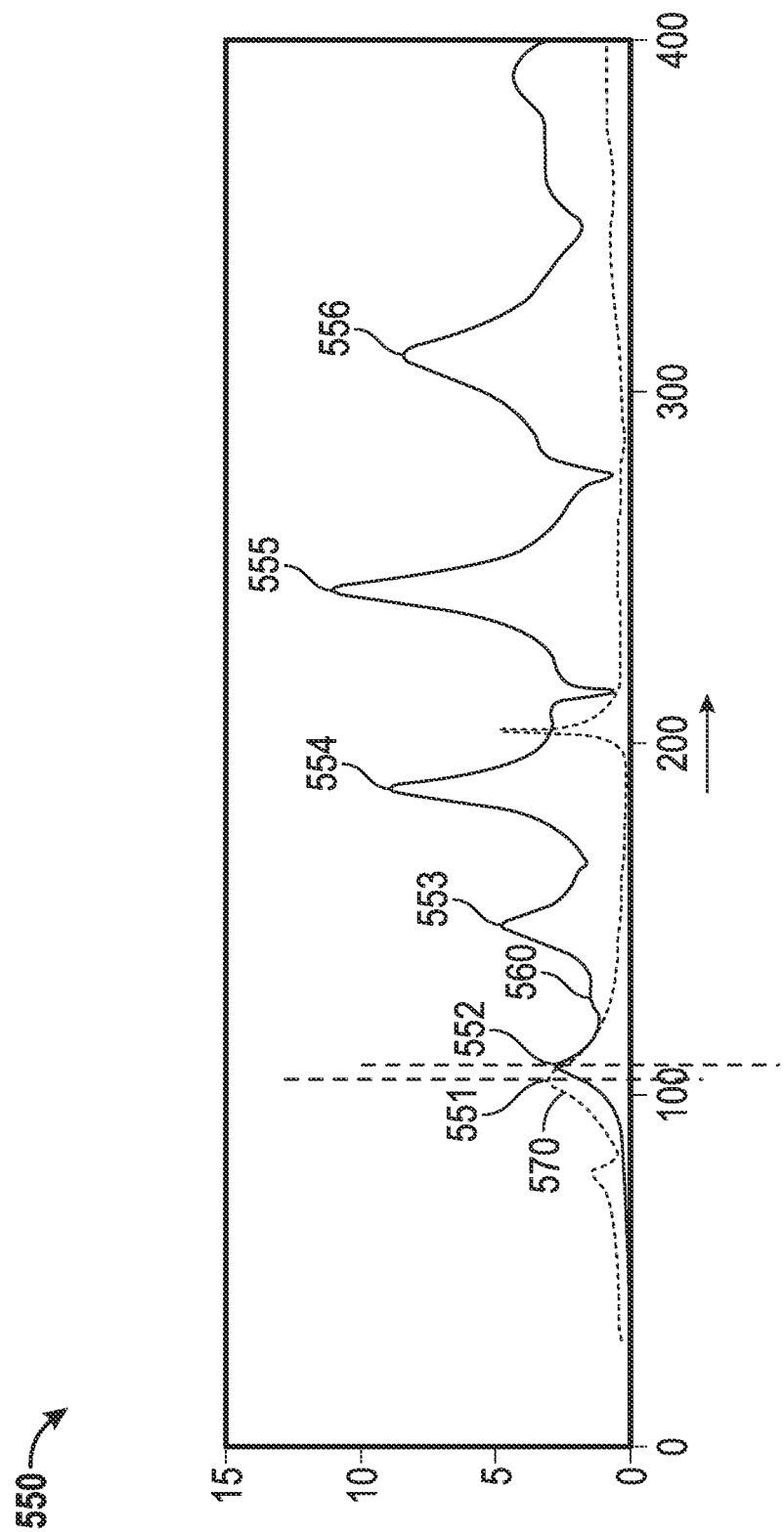
FIG. 5 is a graph of frequency data considered by the system of FIG. 1 and the method of FIG. 4.

In a fourth step 220, the post-processing system 194 identifies the resonant frequencies of the tire 110. FIG. 5 is a graph 550 of spectra obtained from data collected by the accelerometers 180 and evaluated by the post-processing system 194 as shown by the line 560. In the example of FIG. 5, frequency is represented on the horizontal axis and the peaks 551, 552, 553, 554, 555, and 556 are proximate the resonant frequencies for each mode, such as modes 1-6 or greater. The line 570 shows the force motion response resulting from the modes identified by the force-moment transducer 140. In subsequent processing steps, the particular modes are extracted from lines 560, 570 with modal extraction, such as in modal extraction step 408 explained in subsequent sections. As is discussed above and additionally illustrated in FIG. 5, the first mode 551 may be identified from line 570 generated by the force-moment transducer 140, and the higher order modes 552-556 may be identified from line 560 generated by the accelerometers 180. Generally, any number of modes (N) may be extracted, including more than six. As described above, similar frequency data may be collected and evaluated in any orientation and at a number of pneumatic pressures.

If only data from accelerometers 180 is considered, the first modal frequencies may be relatively obscure relative to the other more-energetic modal accelerations. However, the effects of these first modal frequencies are more readily observable in the forces and moments of the force-moment transducer 140 of the testing assembly 120. This condition may arise due to the cyclic asymmetric shapes of the first modes resulting in net dynamic forces and moments exerted against the force-moment transducer 140. As such, one suitable configuration includes the measurement of the first modal frequencies by the force-moment transducer 140. Forces in the respective radial and lateral directions and moments along the respective axes corresponding to the direction of excitation enable quantification of the frequencies of the radial, lateral, tangential first modes and the lateral second mode (produces an out-of-plane moment). The subsequent data-fitting may restrict the modes to those selected as a subset of all of the suggested fitted-modes, consistent with at least some of the criteria cited in the preceding, and then, optionally, executes another iteration of the data-fit using only these selected modal parameters as starting points. In some embodiments, these selection criteria may be implemented in automated processing to provide increased throughput and consistent application of heuristic rule-based decision-making for inclusions and exclusions of suggested modes for subsequent data reduction.

Figure 6:
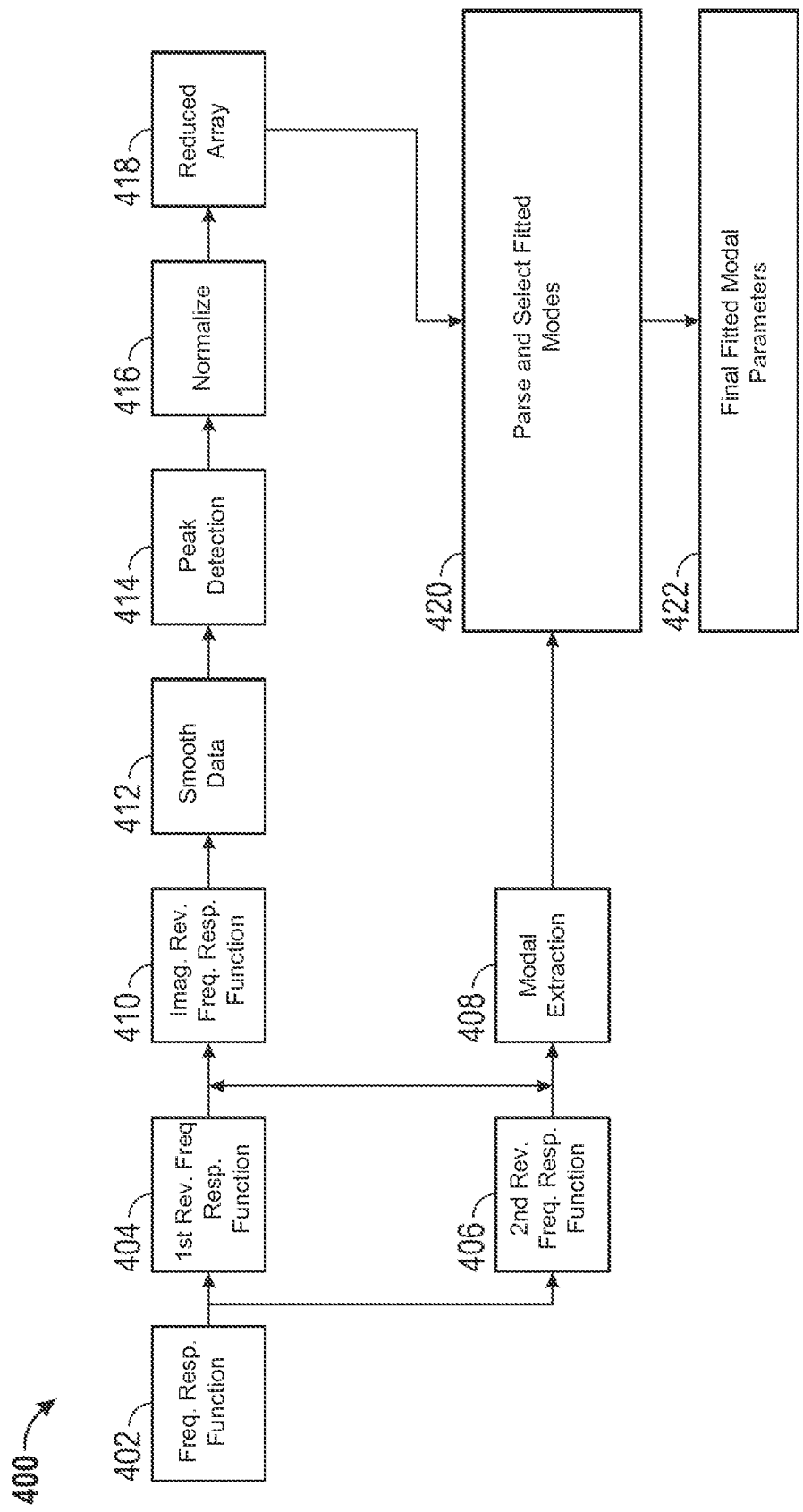
FIG. 6 is a flowchart of a method for extracting undamped frequencies in a radial direction in the system of FIG. 1 and the method of FIG. 4.
Figure 7:
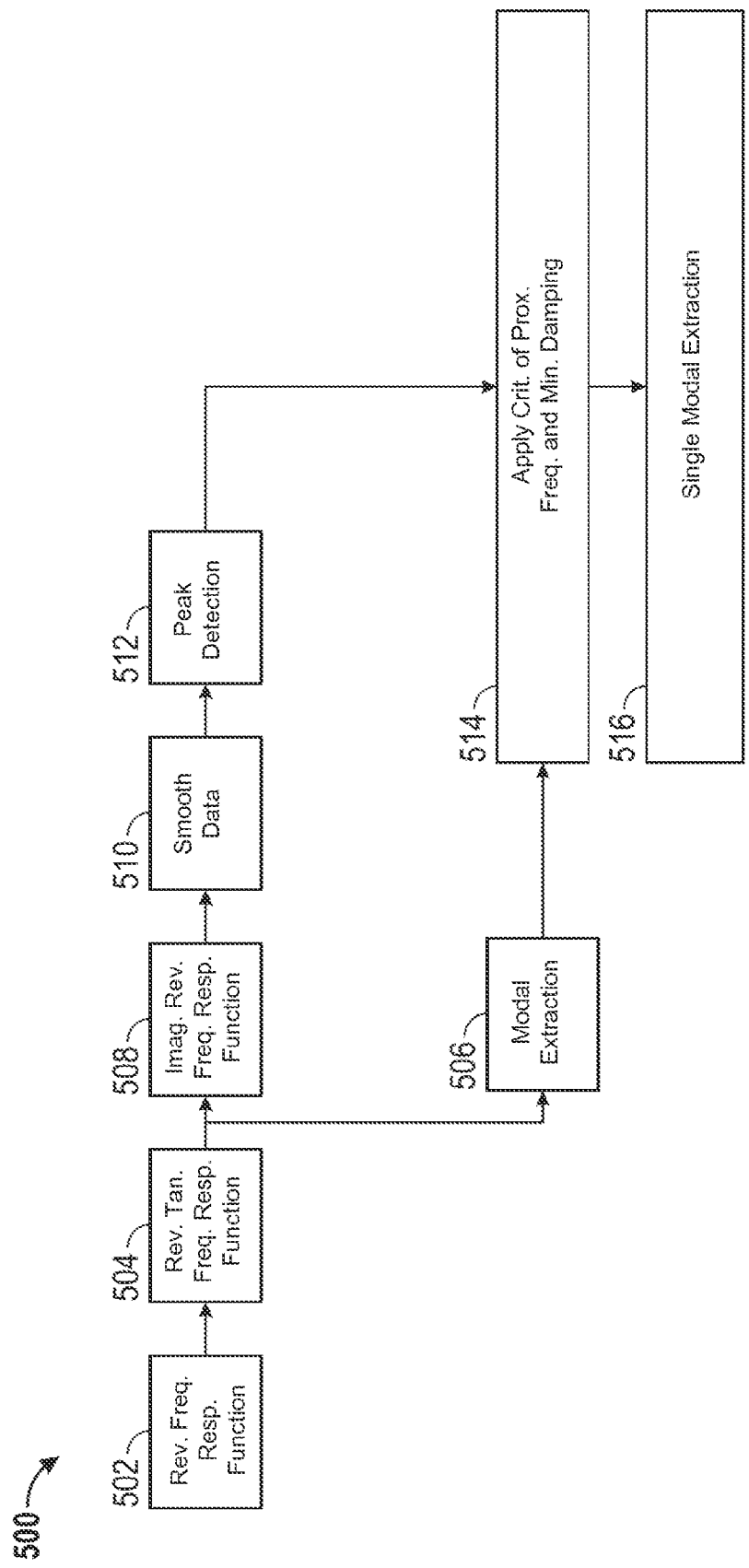
FIG. 7 is a flowchart of a method for extracting undamped frequencies in a tangential direction in the system of FIG. 1 and the method of FIG. 4.
Figure 8:
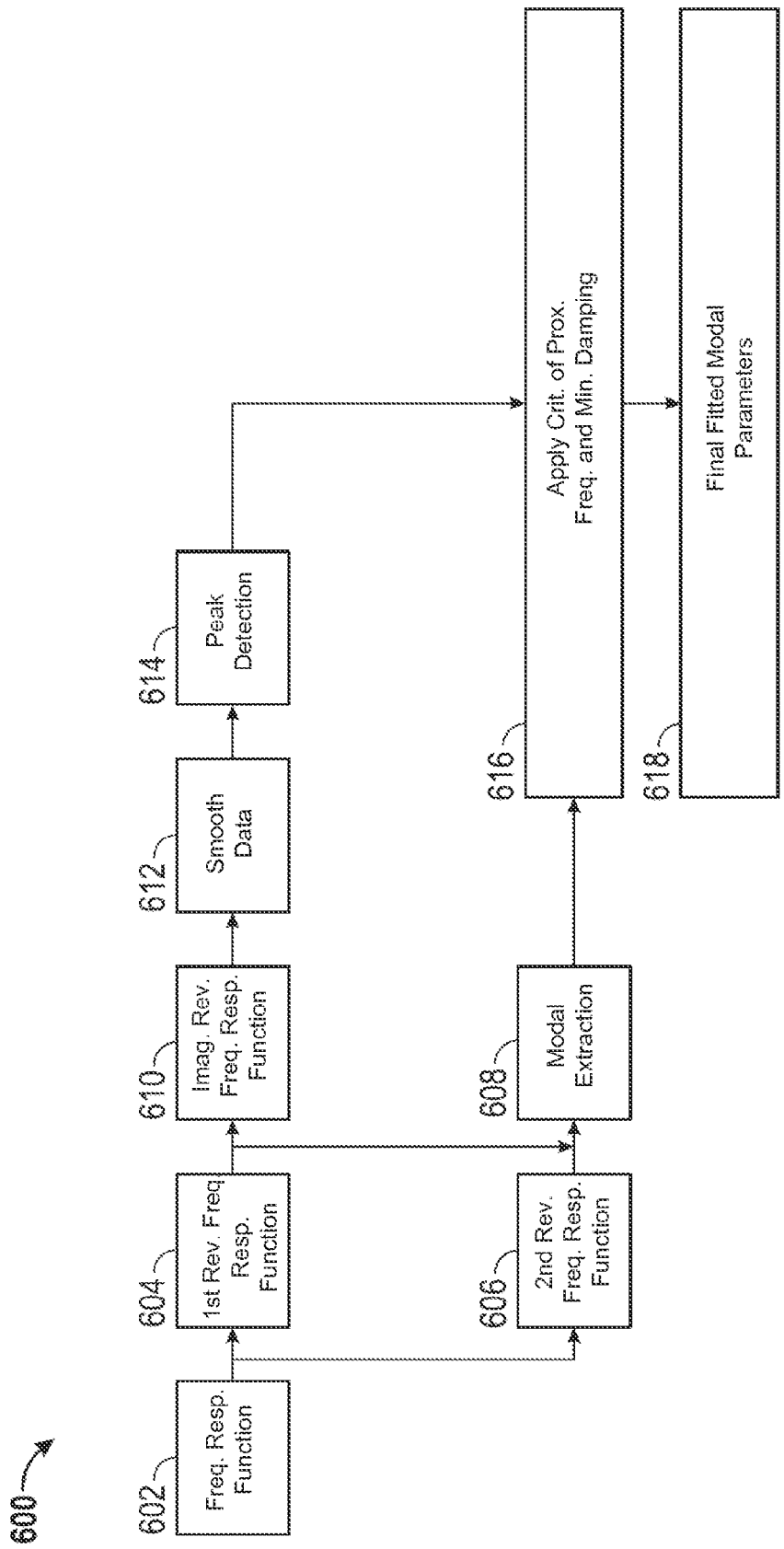
FIG. 8 is a flowchart of a method for extracting undamped frequencies in a lateral direction in the system of FIG. 1 and the method of FIG. 4.

In a fifth step 225, the post-processing system 194 extracts undamped resonant frequencies and damping from the data of step 220. FIG. 6 is a block diagram of one method 400 of extracting the undamped resonant frequencies in the radial direction from the motion data sensed by the accelerometers 180. FIG. 7 is a block diagram of one method 500 of extracting the undamped resonant frequencies in the tangential direction from the motions sensed by the accelerometers 180. FIG. 8 is a block diagram of one method 600 of extracting the undamped resonant frequencies in the lateral direction from the motions sensed by the accelerometers 180.

A number of techniques may be used to extract the undamped frequencies, including those employed in modal parameter extraction techniques. In some cases, user interaction during the extraction process may prevent or mitigate false or pseudo fitted modes resulting from Signal-to-Noise difficulties, insufficient approximations to real tire data, and errors in placement and orientation of the accelerometers. Expectations of a family of resonances with patterned evolution of frequencies, such as quasi-equally spaced or progressively increasing frequencies can be employed as selection criteria. Additional selection criteria may include the consideration of the mode shapes of interest that define a distribution of cyclic strain energy of rubber and the dynamic dilation of the contained air. The dilation of the contained air, furthermore, may occur through mechanisms with relatively low damping, e.g, reinforcing structure (embedded steel and fiber) that may exhibit relatively low damping. In some cases, the presence of the rubber, however, since it exhibits relatively large damping characteristics, also contributes to the net damping for the modes of interest. These considerations may provide some expectations for the amount of fitted damping. Such expectations, therefore, may establish criteria that the fitted modes exhibit damping in excess of a predetermined threshold (for example, as a percentage of critical), while fitted modes that are less than this threshold are judged as spurious or false and need to be excluded for the final data reduction.

FIGS. 6, 7 and 8 display one exemplary embodiment of rule-based automated processing and represent one exemplary implementation for data reduction. In one exemplary embodiment, the blocks represented in FIGS. 6-8 may be performed by the post-processing system 194 of FIG. 1. FIG. 6 illustrates a technique for processing radial-responsive data in two phases with data acquired using two accelerometers 180 placed 180° apart around the tire circumference. The two phases involve data using combinations of the two accelerometers 180 and, for the first phase, the combination includes summing the two frequency response signals (and dividing by two) into a single resultant frequency response signal. In one embodiment, the selection of frequency resolution of the frequency response functions may be 0.25 Hz, although other frequency resolutions may be selected. Using a local axis system for the orientation of the accelerometers 180 as either positive outward or inward (e.g., accelerometers placed at the crown of the tire with positive signal generating either positive outward or inward for both accelerometers), the summing of the accelerometer frequency responses amplifies the even-numbered modes. The subsequent second phase uses the difference of the signals (and dividing by two) and amplifies the odd-numbered modes.

In FIG. 6, the process begins at block 402 with the frequency response function (e.g., dynamic displacement/force) of the acquired radial vibratory data, as obtained by data reduction techniques. If processing the first phase, the process continues at block 404, in which the two frequency response functions of the accelerometer responses are added (and divided by two) to form a first revised frequency response function. If processing the second phase, the process enters at block 406, in which the two frequency response functions of the accelerometer responses are subtracted (and divided by two) to form a second revised frequency response function.

Then, regardless of the phase, the process continues into blocks 408 and 410. At block 408, the revised frequency response function undergoes a modal extraction over a predefined band of frequencies extending from a first modal extraction frequency to a second modal extraction frequency. In one exemplary embodiment, the first modal extraction frequency is about 70% of the first modal frequency determined from the force and moment transducer data and the second modal extraction frequency is about 300 Hz. Additional input parameters may be included, and any number of fitted modes may be generated. The output of block 408 is the first fitted modal parameters, which is provided to block 420.

The revised frequency response function is also passed to block 410 in which the imaginary part of the revised frequency response function is formed and passed to block 412. At block 412, a sliding or moving window averaging is applied to smooth the data using a predefined averaging window length. In the one exemplary implementation, this averaging window comprises seven data points of the imaginary part of the revised frequency response function. At block 414, local maxima of the moving-averaged imaginary part of the revised frequency response are determined This is may be referred to as peak-detection or peak-finding, and any number of accepted algorithms for peak detection may be used, such as, for example, the MATLAB© v7.5.0.133 function titled "findpeaks", returning peak magnitudes and the indices of the peaks of the input argument array of the moving-averaged imaginary part of the revised frequency response function. The frequencies are computed from the returned array indices.

The peak magnitudes of the moving-averaged imaginary part of the revised frequency response function are then passed to block 416 in which the peak magnitudes are normalized by the global peak magnitude (maximum value of all local maxima). These normalized values are then passed to block 418 in which any values of the normalized local maxima less than 10%, for example, may be rejected from the array of local maxima. The resulting reduced array of frequencies corresponding to the local maxima of the moving-averaged imaginary part of the revised frequency response function is then passed to block 420.

At block 420, the frequencies of the reduced local maxima of the moving-averaged imaginary part of the revised frequency response function are used to locate fitted modes from block 408. Also at block 420, the fitted modes are parsed into those modes with damping (e.g., as a percentage of critical) in excess of a damping threshold and those less than or equal to this damping threshold. For example, only modes in excess of the threshold may be candidates for further consideration at block 420. Moreover, in block 420, the nearest match of frequencies of the parsed fitted modes with that of the frequencies of the local maxima of the moving-averaged imaginary part of the revised frequency response function are extracted and passed to block 422 as the parsed, selected fitted modes.

At block 422, the parsed, selected fitted modal parameters of the parsed, selected fitted modes are used as the starting values of another refit of the revised frequency response data using only the parsed, selected modes. The output of block 422 may be considered the final fitted modal parameters. The refits of the preceding may be accomplished by any number of non-linear fitting algorithms. In general, the processes in block 402 through block 422 are one example of a series of techniques for quantifying the desired tire properties in the radial direction.

Turning now to the tangential direction, the process for reducing this data is shown in FIG. 7. Many of the individual operations in the various sequences of operations of data reduction for this response direction correspond to those described in the description of FIG. 6 for the radial direction. At block 502, the frequency response functions of the two accelerometers 180 with sensitive axes now oriented in the tangential direction are summed (and divided by two) to form a revised frequency response function. The orientations of the sensitive axes of the accelerometers 180 are pointed so that acceleration along either the clockwise direction or the counter-clockwise direction produces positive signals from both accelerometers 180. Stated in other words, signals from both accelerometers 180 are the same polarity for a clockwise tangential acceleration. At block 504, the tangential frequency response functions from the tangentially oriented accelerometers 180 are added, divided by two, and subsequently passed to blocks 506 and 508 as the revised tangential frequency response function. Blocks 506, 508 and 512 correspond to blocks 408, 410 and 414 respectively and described above. Block 510 is functionally equivalent to that of block 412, except that the one exemplary implementation uses an averaging window of thirty data points in block 510, in this example. The outputs of blocks 506 and 512 are passed to block 514.

At block 514, criteria of proximate frequencies in the two data streams and the minimum damping (e.g., as a percentage of critical) are applied as described above for the radial direction. This process, however, yields a single modal extraction, e.g., the torsional mode of the tire on the relatively rigid wheel at block 516.

Considering the lateral direction shown in FIG. 8, the blocks 604 and 606 represent actions similar to those of blocks 404 and 406, respectively. Like the actions of process 400, these are likewise conducted in a two phase operation, with the first phase using the sum (divided by two) and the second phase using the difference (divided by two) of the measured lateral accelerations. For these measurements the responsive accelerometers 180 are oriented laterally producing identical signal polarities for lateral movement at both of the accelerometer sites, 180° apart. Blocks 608, 610 and 614 correspond to blocks 408, 410 and 414 respectively, discussed above. Block 612 is functionally equivalent to that of block 412, except that one exemplary implementation uses an averaging window of thirty data points in block 610, in one example. The outputs of blocks 608 and 614 are passed to block 616.

At block 616, criteria of proximate frequencies in the two data streams and the minimum damping (e.g., as a percentage of critical) are applied as stated above for the radial direction. The final results (modal parameters comprising undamped frequencies, damping (e.g., as a percentage of critical)) are passed to block 618.

The damping may be expressed as a percentage of critical damping. As an example, Table 1 illustrates the percentage of damping as a function of the modal number and pressures of the family of radial modes.

TABLE 1

| DAMPING (%) (via modal parameter estimation) | | | | | | |
|---|---|---|---|---|---|---|
| N | 20 psi | 30 psi | 35 psi | 40 psi | 50 psi | means |
| 1 | 6.1 | 6.2 | 6.3 | 5.5 | 5.2 | 5.9 |
| 2 | 5.2 | 4.6 | 4 | 4 | 3.5 | 4.3 |
| 3 | 5 | 4.5 | 4.1 | 4 | 4 | 4.3 |
| 4 | 4.9 | 4.4 | 3.9 | 3.7 | 3.4 | 4.1 |
| 5 | 4.7 | 3.6 | 3.5 | 3.4 | 3.2 | 3.7 |
| 6 | 4 | 3.3 | 3.2 | 2.8 | 2.6 | 3.2 |
| means | 5 | 4.4 | 4.2 | 3.9 | 3.7 | | overall damping (mean): 4.2%

As noted above, the undamped resonant frequencies may be used for any suitable purpose. In subsequent, optional steps of method 200 described below, one exemplary use of the undamped resonant frequencies is discussed. Returning to FIG. 4, in a further step 230, the undamped resonant frequencies in Equation (2) are used in a linear regression to yield the stiffness coefficients ($Coef_1$, $Coef_2$, $Coef_3$, and $Coef_4$) for various pressures in each of the directions. The stiffness coefficients may be determined with a least squares methodology, initially unconstrained. If the resulting stiffness coefficients from the unconstrained fitting are less than zero (physically non-realizable), the coefficients may be refitted such that the results are constrained greater than zero, using the unconstrained positive coefficients with the unconstrained negative coefficients set to zero as the initial conditions for the constrained optimization.

Figure 9:
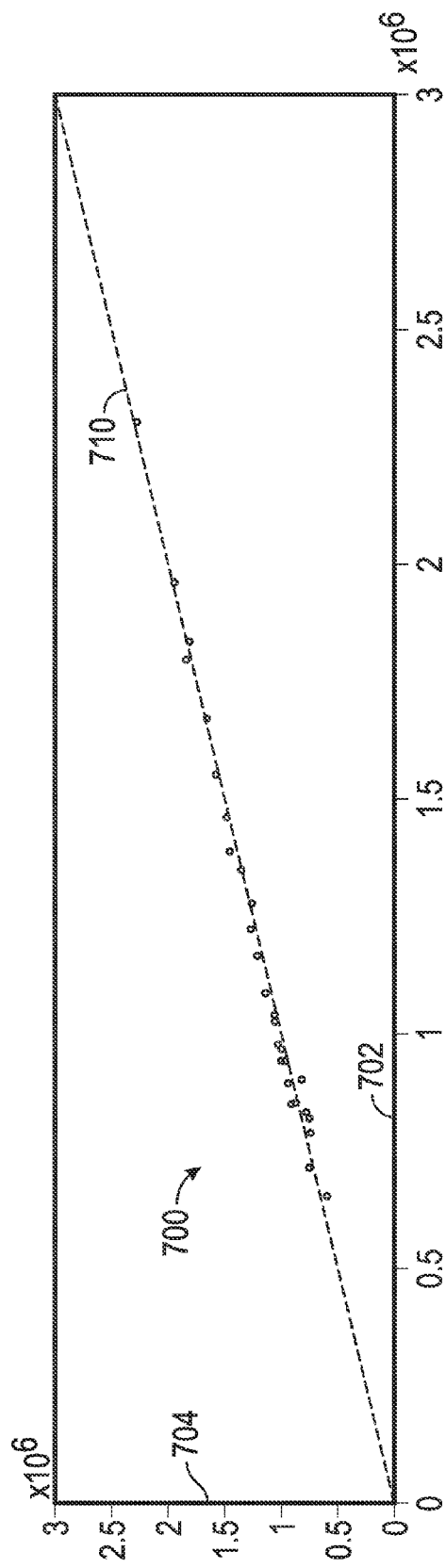
FIG. 9 is a graph indicating the ability of calculated stiffness coefficients to describe the radial resonant frequency data, in units of $(rad/sec)^2$, in the system of FIG. 1 and the method of FIG. 4.

FIG. 9 is a graph 700 that illustrates the ability of the stiffness coefficients to describe the undamped resonant frequencies. Particularly, the graph 700 includes the resonant frequencies (squared) calculated with the coefficients on the horizontal axis 702 and undamped resonant frequencies (squared) originally extracted from the measurements on the vertical axis 704. The stiffness coefficients at various pressures in the radial direction for six fitted modes are plotted with a reference 1:1 line 710. As shown, the stiffness coefficients are successful in describing the frequencies observed in the tire during step 205.

Figure 10:
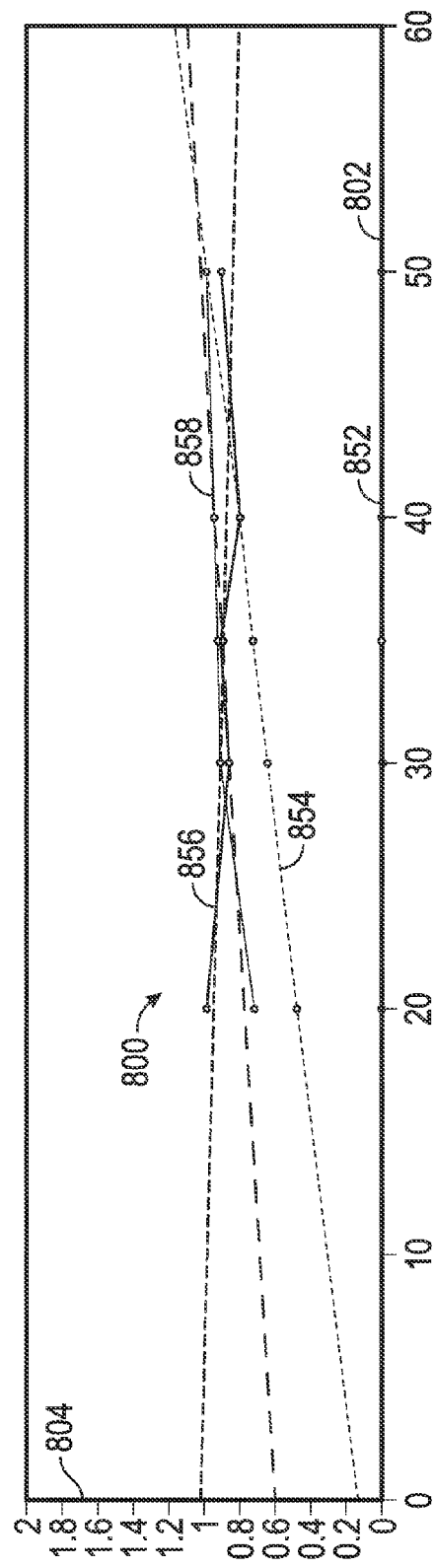
FIG. 10 is a graph indicating the amplitude of radial stiffness coefficients as a function of pressure in the system of FIG. 1 and the method of FIG. 4.

The stiffness coefficients may also demonstrate the pneumatic vs non-pneumatic contributions to the total stiffness properties. FIG. 10 is a graph 800 that illustrates the amplitude of stiffness coefficients (normalized) on the vertical axis

804 as a function of pressure (psi) on the horizontal axis 802. Lines representing the stiffness coefficients include that of the curvature (Coef$_1$: $(n^2-1)^2$) 852, first shear (Coef$_2$: $(n-n^{-1})^2$) 854, second shear stiffness (Coef$_3$: $n^2$) 856, and radial stiffness (Coef$_4$: constant) 858. Since the frequency data is collected at a number of pneumatic pressures, the stiffness coefficients may be further characterized by the pneumatic and nonpneumatic contributions to the respective stiffness.

Returning to FIG. 4, in a further step 235, the stiffness and damping coefficients are considered with respect to desired and undesired laboratory and driving responses. In other words, the stiffness and damping coefficients represent stiffnesses and damping that impact the behavior of the tire. Some of the laboratory and driving responses include rates, force and moment under slip (steered and circumferential), camber and load, rolling resistance, vibratory measurements of vehicles equipped with the tires, motion responses during steering, and other ride and handling metrics such as hardness, harshness, steering, on center, lash, valley feel, ultimate handling, transient time response, and the like. These responses may be objectively quantified with instrumented measurements or may be subjectively quantified on arbitrary dimensional scales, such as those generally used by tire and automotive engineers and technicians. As shown below in Equation (3), influence coefficients may be established to relate the driving responses to the parameter coefficients.

$$\underbrace{\begin{bmatrix} \text{Ride} \\ \text{Hardness} \\ \text{Harshness} \\ \text{Steering} \\ \ldots \\ \ldots \\ \ldots \\ \ldots \end{bmatrix}}_{\text{RESPONSES}} = \underbrace{\begin{bmatrix} a11 & a12 & a13 & \ldots & \ldots \\ a21 & a22 & a23 & \ldots & \ldots \\ a31 & a32 & a33 & \ldots & \ldots \\ a41 & a42 & a43 & \ldots & \ldots \\ \ldots & & & & \\ \ldots & & & & \\ \ldots & & & & \\ \ldots & & & & \end{bmatrix}}_{\text{INFLUENCE COEFFICIENTS}} \underbrace{\begin{bmatrix} \text{Coeff1(rad)}(p1) \\ \ldots \\ \text{Coeff1(circ)}(p1) \\ \ldots \\ \text{Coeff1(lat)}(p1) \\ \ldots \\ \text{Coeff2(rad)}(p1) \\ \ldots \\ \ldots \end{bmatrix}}_{\substack{\text{STIFFNESS/}\\\text{DAMPING}\\\text{COEFFICIENTS}}} \quad \text{Eq. (3)}$$

Accordingly, for each driving response, the influence coefficients may provide an indication of the contributions for various types of stiffnesses and damping to describe a driving response. As one example, structure borne noise is a type of driving response, and Equation (3) yields influence coefficients for the particular stiffnesses that contribute to structure borne noise. In one calculated example, the structure borne noise may be represented by Equation (4):

$$SBN = \\ (C1 * Rad.Stiff.(\text{pneum.})) + (C2 * Rad.Stiff.(\text{non-pneum.})) + \\ (C3 * \text{Second Shear } Stiff.(\text{non-pneum.})) \quad \text{Eq. (4)}$$

Accordingly, in step 240, the influence coefficients and parameter coefficients may be used to characterize a tire. For example, the particular stiffnesses and damping and influence coefficients may be used to characterize the anticipated driving responses for the tire. Using the structure borne noise example discussed above, the influence and parameter coefficients for a characterized tire may be used to predict the anticipated amount of structure borne noise. Alternatively, the tire may be designed with stiffness and damping characteristics that yield desired tire responses. Returning to the structure borne noise example, a threshold limit of structure borne noise may be desired, and a tire with the required stiffnesses to meet that limit may be designed. By non-exclusive example only, these stiffnesses and damping parameters can be adjusted by changes in the geometric shape of the tire influencing the internal tensions and they can also be changed by the distribution, amount and type of reinforcing material, e.g., rubber, steel, polyester.

Accordingly, improved methods and systems are provided for characterizing tires of vehicles. The above-described embodiments provide a highly accurate, cost-effective and reliable mechanism for characterizing, evaluating and specifying tires of a vehicle. This allows for improved testing and evolution of tires for vehicle fitments as well as improved fine-tuning of how the particular types of tires are engineered, manufactured, how the tires are aligned, managed, controlled, and/or utilized in the vehicle, how and when the tires are maintained, and/or how and when the tires are replaced, among other possible applications of the methods and systems provided herein. It will be appreciated that, while the disclosed methods and systems are described above as being used in connection with automobiles such as sedans, trucks, vans, sports utility vehicles, and cross-over vehicles, the disclosed methods and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for characterizing a vehicle tire, comprising:
   a testing assembly configured to support the vehicle tire and comprising a mount apparatus configured to secure the vehicle tire,
      a force-moment transducer underneath the mount apparatus and supporting the mount apparatus, the force-moment transducer configured to gather force information from the vehicle tire in response to a stimulus on the vehicle tire,
      a plate assembly underneath the force-moment transducer and supporting the force-moment transducer, and
      an isolation apparatus underneath the plate assembly and supporting the plate assembly, the isolation apparatus including an air spring apparatus configured to isolate the mount apparatus, the force-moment transducer, and the plate assembly from an underlying surface;
   an accelerometer coupled to the vehicle tire and configured to gather vibration information from the vehicle tire in response to the stimulus on the vehicle tire; and
   a post-processing system configured to receive the vibration information from the accelerometer and the force information from the force-moment transducer, the post-processing system further configured to extract resonant frequencies from the vibration information and the force information.

2. The system of claim 1, wherein the post-processing system is configured to extract resonant frequencies associated with a first mode based on the vibration information and extract resonant frequencies associated with a second mode based on the force information.

3. The system of claim 1, further comprising a force device configured to generate the stimulus on the vehicle tire.

4. The system of claim 1, wherein the air spring apparatus comprises at least one air bladder.

5. The system of claim 1, wherein the post-processing system is further configured to determine undamped resonant frequencies from the vibration information and the force information.

6. The system of claim 1, wherein the post-processing system is further configured to calculate pneumatic and non-pneumatic contributions to stiffness characteristics.

7. The system of claim 1, wherein the post-processing system is further configured to calculate stiffness characteristics including stiffness coefficients for at least one of bending, first shear, second shear, and radial stiffness.

8. The system of claim 1, wherein the post-processing system is further configured to calculate stiffness characteristics according to the following equation:

$$\rho \cdot [2\pi]^2 \cdot f_{0n}^2 \cdot \left[1 + \frac{1}{n^2}\right] = \frac{\text{Coef}_1}{R^4} \cdot [n^2 - 1]^2 + \frac{\text{Coef}_2}{R^2} \cdot \left[n - \frac{1}{n}\right]^2 + \text{Coef}_3 \cdot \frac{1}{n^2} + \text{Coef}_4$$

wherein
$f_{0n}$=temporal frequencies, $f_0$, of the undamped modes, n, where n=1, 2, 3, ... N,
n=mode number,
N=total number of modes,
$\rho$=density per unit circumference, $M/(2\pi R)$, kg/m,
R=radius of tire, m,
$\text{Coef}_1$=the stiffness coefficient associated with bending,
$\text{Coef}_2$=the stiffness coefficient associated with first shear,
Coef3=the stiffness coefficient associated with second shear, and
$\text{Coef}_4$=the stiffness coefficient associated with radial displacement.

9. A testing assembly for a vehicle tire, comprising:
a mount apparatus configured to receive the vehicle tire;
a force-moment transducer underneath the mount apparatus and supporting the mount apparatus, the force-moment transducer configured to detect a force response associated with striking the vehicle tire;
a plate assembly underneath the force-moment transducer and supporting the force-moment transducer; and
an air spring apparatus underneath the plate assembly and isolating the force-moment transducer from a fixture response associated with the testing assembly relative to an underlying surface upon the striking the vehicle tire.

10. The testing assembly of claim 9, wherein the force-moment transducer is configured to detect at least one asymmetric tire mode.

11. The testing assembly of claim 9, wherein the air spring apparatus includes at least one air bladder supporting the plate assembly.

12. A method for characterizing a vehicle tire, the method comprising the steps of:
impacting the vehicle tire with a force;
measuring vibration information with an accelerometer from the vehicle tire;
measuring force information with a force-moment transducer from the vehicle tire;
extracting the resonant frequencies from the measured vibration information and the measured force information and
characterizing the vehicle tire based on the resonant frequencies, the characterizing including
calculating stiffness characteristics of the vehicle tire according to the following equation:

$$\rho \cdot [2\pi]^2 \cdot f_{0n}^2 \cdot \left[1 + \frac{1}{n^2}\right] = \frac{\text{Coef}_1}{R^4} \cdot [n^2 - 1]^2 + \frac{\text{Coef}_2}{R^2} \cdot \left[n - \frac{1}{n}\right]^2 + \text{Coef}_3 \cdot \frac{1}{n^2} + \text{Coef}_4$$

wherein
$f_{0n}$=temporal frequencies, $f_0$, of the undamped modes, n, where n=1, 2, 3, ... N,
n=mode number,
N=total number of modes,
$\rho$=density per unit circumference, $M/(2\pi R)$, kg/m,
R=radius of tire, m,
$\text{Coef}_1$=the stiffness coefficient associated with bending,
$\text{Coef}_2$=the stiffness coefficient associated with first shear,
Coef3=the stiffness coefficient associated with second shear, and
$\text{Coef}_4$=the stiffness coefficient associated with radial displacement.

13. The method of claim 12, further comprising isolating the force-moment transducer from fixture response with an air spring apparatus.

\* \* \* \* \*